(12) United States Patent
Soble

(10) Patent No.: US 6,270,586 B1
(45) Date of Patent: Aug. 7, 2001

(54) VEHICLE WASHING DEVICE

(76) Inventor: Scott E. Soble, 5680 Woodsmore Dr., Solon, OH (US) 44139

( * ) Notice: Subject to any disclaimer, the term of this patent is extended or adjusted under 35 U.S.C. 154(b) by 0 days.

(21) Appl. No.: 09/715,373

(22) Filed: Nov. 18, 2000

Related U.S. Application Data

(63) Continuation-in-part of application No. 09/557,461, filed on Apr. 24, 2000, now abandoned, which is a continuation-in-part of application No. 09/178,345, filed on Oct. 26, 1998, now abandoned.

(51) Int. Cl.[7] ........................................................ B60S 3/04
(52) U.S. Cl. ................................ 134/32; 134/34; 134/123
(58) Field of Search ............................... 134/32, 45, 123, 134/34

(56) References Cited

U.S. PATENT DOCUMENTS 4,971,084 * 11/1990 Simth et al. ..................... 134/123 X

* cited by examiner

*Primary Examiner*—Philip R. Coe
(74) *Attorney, Agent, or Firm*—James A. Hudak

(57) ABSTRACT

A vehicle washing device that concentrates a spray of high pressure water on the wheels of the vehicle for an extended period of time is disclosed. A vehicle washing device is located on either side of the vehicle so as to direct a spray of high pressure water therefrom toward the vehicle as it passes thereby. An actuating mechanism is provided for each of the vehicle washing devices permitting the washing device to rotate about its vertical axis so as to direct the water spray therefrom for an extended period of time toward each of the vehicle wheels. In this manner, the "dwell" time of the high pressure water spray from each vehicle washing device is increased on the front wheels and on the rear wheels of the vehicle, thus allowing the wheels to be cleaned without manually scrubbing same.

7 Claims, 5 Drawing Sheets

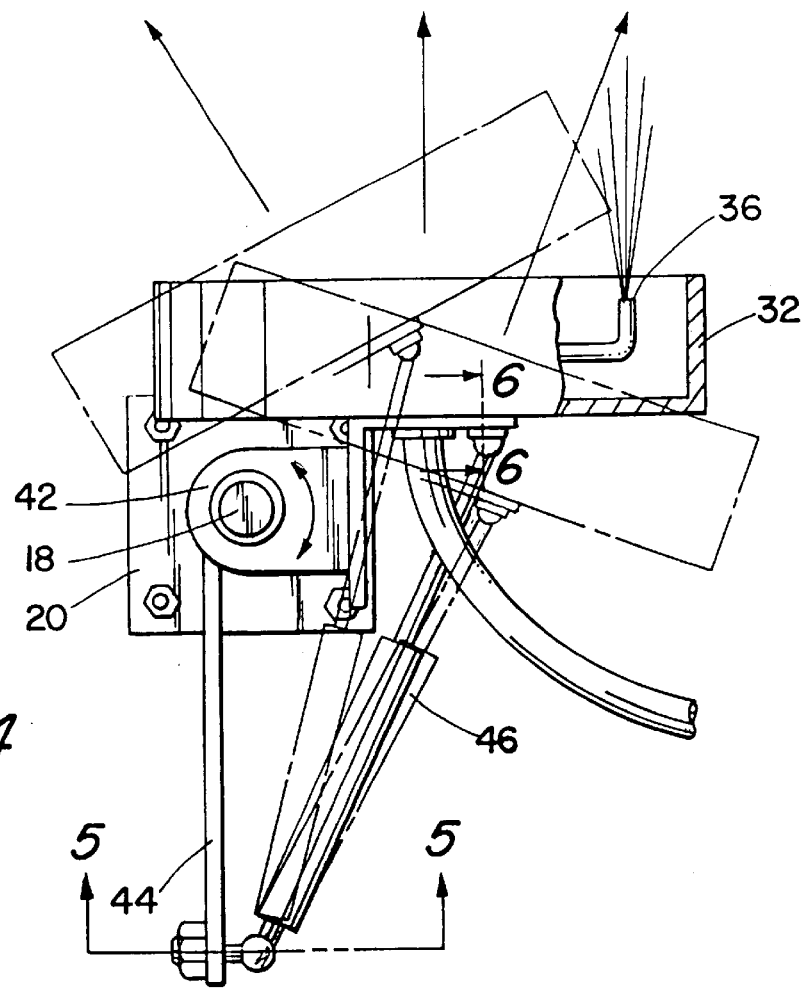
Fig. 4
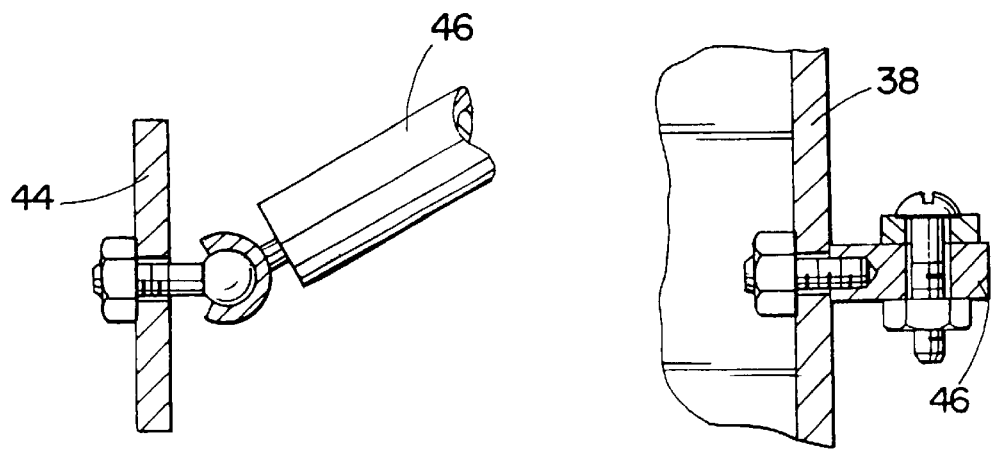
Fig. 5
Fig. 6

VEHICLE WASHING DEVICE

This application is a continuation-in-part of application Ser. No. 09/557,461 filed on Apr. 24, 2000, and now abandoned, which was in turn a continuation-in-part of application Ser. No. 09/178,345 filed on Oct. 26, 1998, and now abandoned.

TECHNICAL FIELD

The present invention relates, in general, to a device for washing vehicles and, more particularly, to a vehicle washing device that concentrates a spray of high pressure water on the vehicle wheels for an extended period of time resulting in the cleaning of the wheels without scrubbing same.

BACKGROUND ART

Numerous devices are available for automatically washing vehicles, including cars or trucks. Such devices are typically installed in automatic car wash facilities. As such, the devices are rather complex in nature permitting the vehicle to be washed substantially automatically while minimizing the labor associated with the washing process. However, since the wheels of the vehicle are easily scuffed and subjected to mud, snow, road grime, etc., the wheels typically must be scrubbed manually or cleaned by using a wheel scrubbing machine. Such wheel scrubbing machines are rather complex and require actuating mechanisms to apply brushes or other scrubbing devices to the wheels. In addition, some scrubbing machines also include apparatus to rotate the wheel in relation to the scrubbing brushes. In any event, such wheel scrubbing machines are costly to install and maintain. Furthermore, since the machines actually scrub the wheel, any machine malfunction might result in damage or wear to the wheel or to the tire mounted thereon.

In view of the foregoing, it has become desirable to develop a vehicle washing device which is relatively inexpensive to produce and/or maintain, and which concentrates high pressure water spray on the vehicle wheels to clean same without scrubbing.

SUMMARY OF THE INVENTION

The present invention solves the problems associated with prior art washing devices used primarily to clean vehicle wheels and other problems by providing a relatively simple device for spraying the lower portion of a vehicle with high pressure water and, while spraying the vehicle, concentrating the water spray for a period of time on the vehicle wheels. In this manner, the vehicle wheels can be cleaned without manually scrubbing same. In order to accomplish the foregoing, the vehicle washing device of the present invention operates in a unique manner. As the vehicle enters the car wash facility, two vehicle washing devices, each located on either side of the vehicle, direct a spray of high pressure water toward the front of the vehicle and the hood of same. As the vehicle continues to travel through the car wash, the vehicle washing devices concentrate their high pressure water spray on the rear portions of the front wheels of the vehicle. As the vehicle continues to move through the car wash, the vehicle washing devices rotate about their vertical axis so as to continue concentrating high pressure water spray on the front wheels of the vehicle for an extended period of time. As the vehicle continues to travel through the car wash, the vehicle washing devices direct high pressure water spray on the lower portion of the vehicle between the front and rear wheels of same. As the rear wheels of the vehicle approach the vehicle washing devices, the devices rotate about their vertical axis so as to concentrate high pressure water spray on the rear wheels of the vehicle. The vehicle washing devices then rotate about their vertical axis to continue to concentrate high pressure water spray on the rear wheels of the vehicle for an extended period of time. After the rear wheels of the vehicle have moved past the vehicle washing devices, the devices concentrate their high water pressure spray toward the rear quarter panels and the trunk lid of the vehicle. The vehicle washing devices then rotate about their vertical axis so as to be in the proper position for the next vehicle entering the car wash. Because the "dwell" time of the high pressure water spray from each vehicle washing device is increased on the front wheels and on the rear wheels of the vehicle, the wheels are cleaned without the need to scrub same.

BRIEF DESCRIPTION OF THE DRAWINGS

FIG. 4 is a top plan view of the vehicle washing device of the present invention.

FIG. 5 is a cross-sectional view taken across section-indicating lines 5—5 in FIG. 4.

FIG. 6 is a cross-sectional view taken across section-indicating lines 6—6 in FIG. 4.

DESCRIPTION OF THE PREFERRED EMBODIMENT

Figure 1:
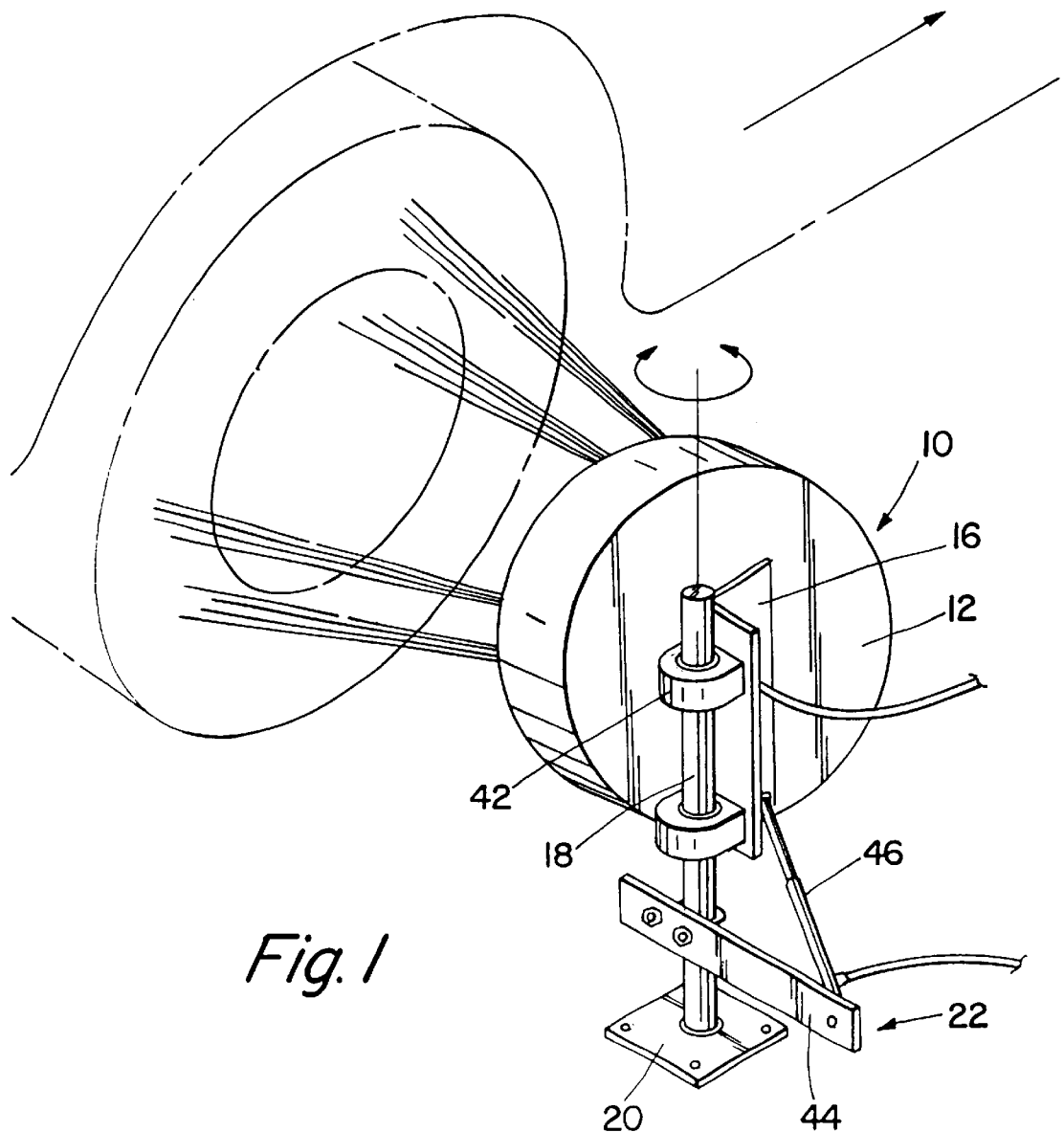
FIG. 1 is a perspective view of the vehicle washing device of the present invention.
Figure 2:
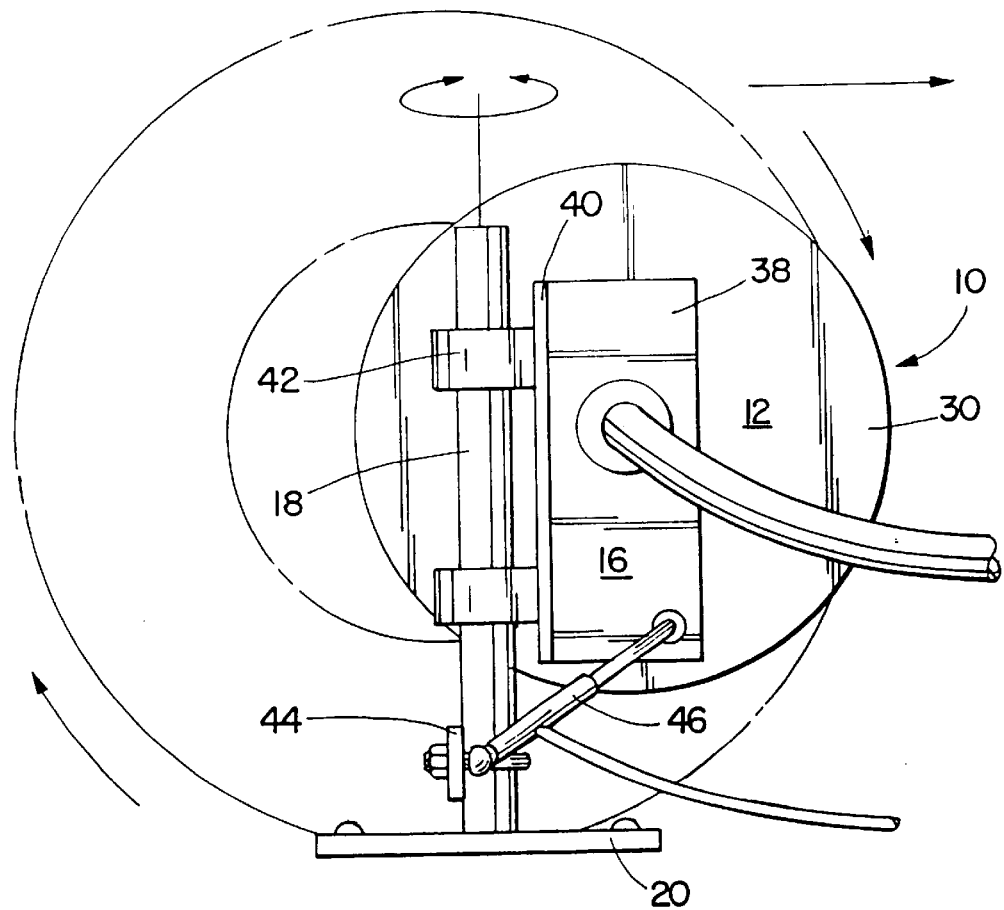
FIG. 2 is a rear elevation view of the vehicle washing device of the present invention.
Figure 3:
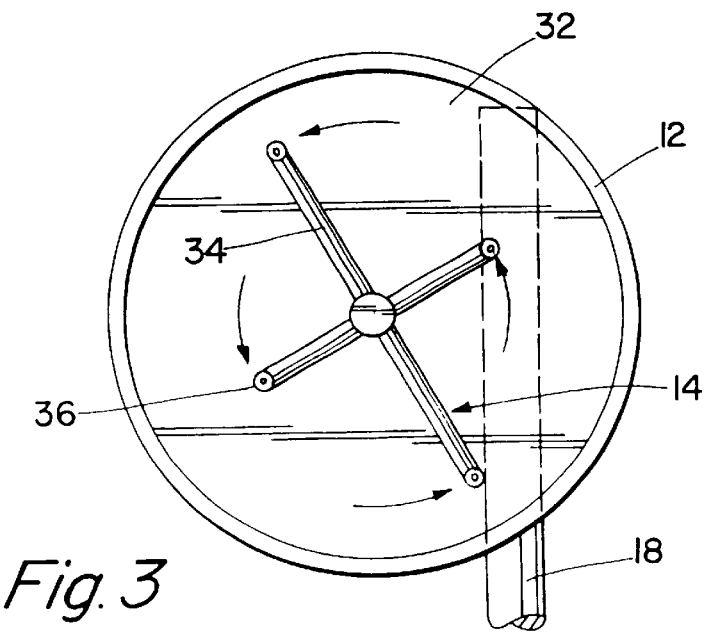
FIG. 3 is a front elevation view of the vehicle washing device of the present invention.

Referring now to the drawings where the illustrations are for the purpose of describing the preferred embodiment of the present invention and are not intended to limit the invention disclosed herein, FIG. 1 is a perspective view of the vehicle washing device 10 of the present invention. The vehicle washing device 10 includes a housing 12, a nozzle structure 14 rotatable within the housing 12, a support bracket 16 attached to the rear surface of the housing 12, a mounting shaft 18 on which the support bracket 16 is rotatable thereon, a base member 20 to which the mounting shaft 18 is attached at one end thereof, and a housing pivoting mechanism 22 attached to the mounting shaft 18 and to the support bracket 16.

The housing 12 is formed from a moldable material and is typically cylindrical in configuration having a substantially flat rear surface 30 on one end thereof and an opening 32 at the other end thereof. The nozzle structure 14 is rotatably supported within the housing 12 and is comprised of a plurality of arms 34 each having a nozzle head 36 at each end thereof. Water, under pressure, is supplied to the nozzle structure 14 causing the nozzle structure 14 to rotate within the housing 12 without the use of an additional driving means. Support bracket 16 is typically L-shaped in configuration with one leg 38 thereof being attached to rear surface 30 of housing 12 by fasteners (not shown). The other leg 40 of support bracket 16 has a pair of pillow blocks 42 attached thereto in a spaced-apart relationship. Mounting shaft 18 is received within pillow blocks 42 and supports housing 12 and nozzle structure 14 therein for rotation thereabout. Housing pivoting mechanism 22 is comprised of an arm member 44 which is connected to mounting shaft 18 and a connecting arm 46 which is pivotally connected to arm member 44 at one end thereof and to leg 38 of support bracket 16 at the other end thereof. Housing pivoting mechanism 22 is actuated pneumatically rather than hydraulically or through the use of a combination of pneumatic and hydraulic sources. Actuation of housing pivoting mechanism 22 causes housing 12 and nozzle structure 14 therein to rotate about mounting shaft 18.

Operationally, the vehicle washing device 10 of the present invention is utilized to spray the lower portion of a car or truck and, while spraying the lower portion of the vehicle, concentrates high pressure water spray therefrom on the vehicle wheels for an extended period of time. In this manner, the wheels can be washed without manually scrubbing same. Typically, to accomplish the foregoing, two vehicle washing devices 10 are utilized with a vehicle washing device 10 positioned on either side of the vehicle as the vehicle passes through a car wash facility.

Figure 7:
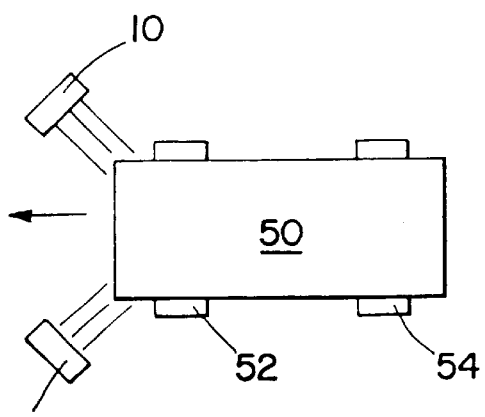
FIGS. 7–18 are schematic diagrams of a vehicle showing its movement through a car wash facility having the vehicle washing devices of the present invention installed therein and showing the orientation of the vehicle washing devices with respect to the vehicle and the vehicle wheels during the washing process.
Figure 8:
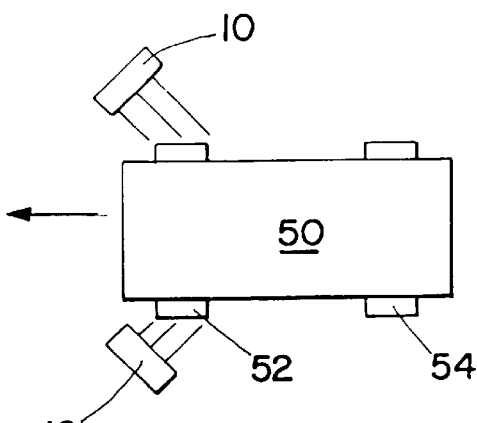
Figure 9:
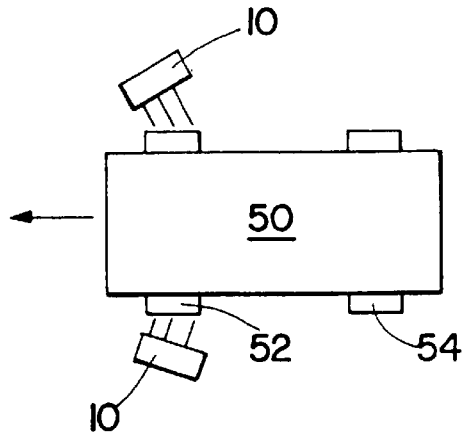
Figure 10:
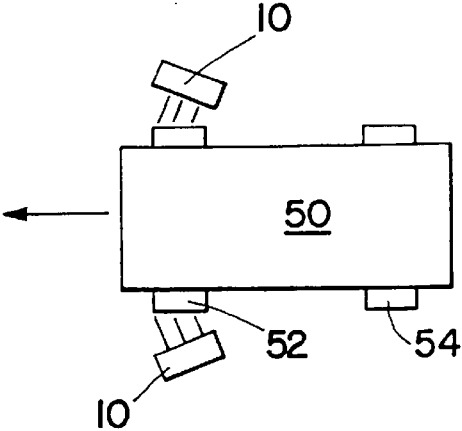
Figure 11:
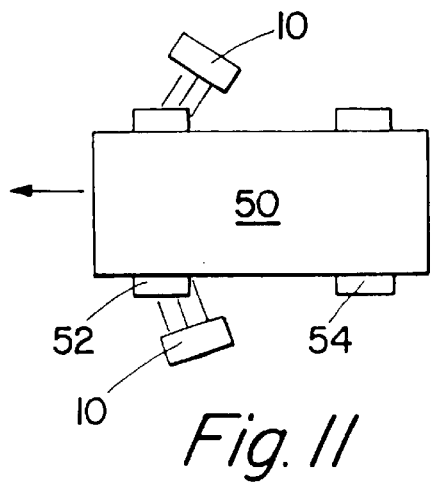

Referring to FIGS. 7–18, a description of the operation of the vehicle washing device 10 and the manner in which the washing devices 10 concentrate their respective spray of high pressure water on the wheels of a vehicle as it passes through a car wash facility will now be presented. Referring now to FIG. 7, a schematic diagram of a vehicle 50 entering a car wash facility and showing the orientation of a vehicle washing device 10, in a first position, on opposite sides of the vehicle 50 is illustrated. As the vehicle 50 enters the car wash, high pressure water is supplied to the washing devices 10 on either side of the vehicle 50 causing the nozzle structures 14 therein to rotate within the housing 12 resulting in the housing 12 directing high pressure water spray from the nozzle heads 36 toward the front of the vehicle 50 and its hood surface. As the vehicle 50 progresses further into the car wash, as shown in FIGS. 8 and 9, the nozzle heads 36 within the washing devices 10 concentrate high pressure water spray on the rear portions of the front wheels 52 on the vehicle 50. As the vehicle 50 continues to move through the car wash, the housing pivoting mechanism 22 for each washing device 10 is actuated by the application of air pressure thereto causing each washing device 10 to rotate about its mounting shaft 18 in an uninterrupted motion through an arc of approximately 30 degrees in the direction of vehicle travel into a second position, as shown in FIGS. 10 and 11. In this manner, high pressure water spray from the nozzle heads 36 in each washing device 10 continues to be concentrated on the front wheels 52 of the vehicle 50. Thus, the "dwell" time of the high pressure water spray from each washing device 10 is increased on the front wheels 52 of the vehicle 50 so as to clean the wheels 52 without the need to manually scrub same.

Figure 12:
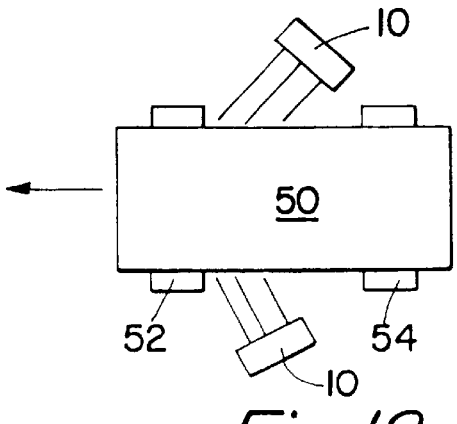
Figure 13:
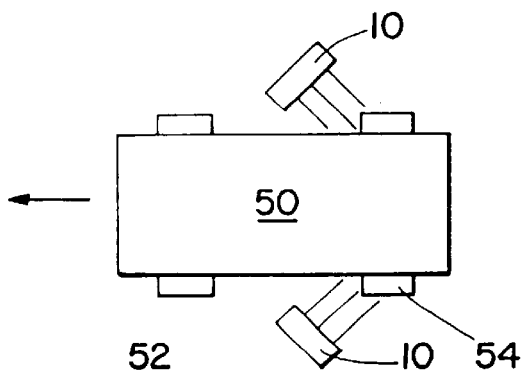
Figure 14:
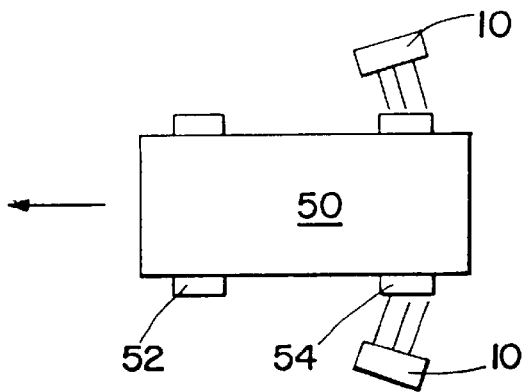
Figure 15:
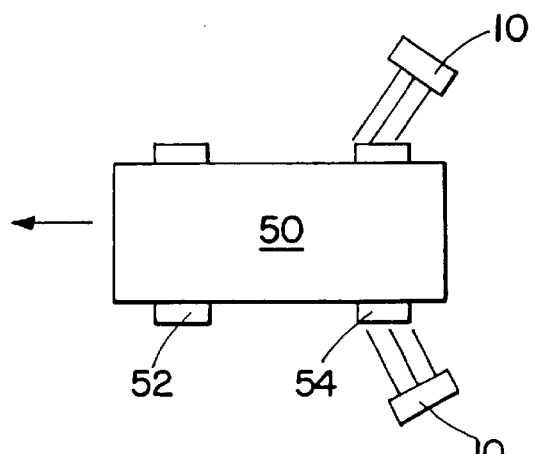
Figure 16:
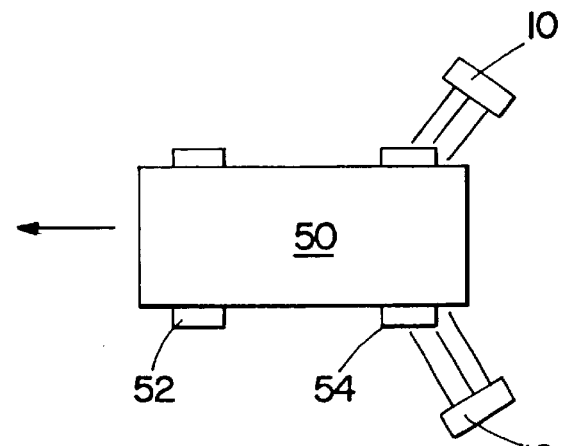

As the vehicle 50 continues to move through the car wash, the washing devices 10 concentrate water spray from the nozzle heads 36 therein on the lower portion of the vehicle, as shown in FIG. 12. As the rear wheels 54 of the vehicle 50 approach the washing devices 10, the housing pivoting mechanism 22 for each washing device 10 is actuated by the application of air pressure thereto causing each washing device 10 to rotate about its mounting shaft 18 in an uninterrupted motion through an arc of approximately 30 degrees in the direction opposite to vehicle travel into the first position. In this manner, high pressure water spray from each washing device 10 is concentrated toward the rear portions of the rear wheels 54 of the vehicle 50, as shown in FIGS. 13 and 14. As the vehicle 50 continues to move through the car wash, the washing devices 10 continue to concentrate high pressure water spray from their respective nozzle heads 36 on the rear wheels 54 of the vehicle 50. When the rear wheels 54 of the vehicle 50 have moved past the washing devices 10, the housing pivoting mechanism 22 for each washing device 10 is again actuated by the application of air pressure thereto causing each washing device 10 to again rotate about its respective mounting shaft 18 in an uninterrupted motion through an arc of approximately 30 degrees in the direction of vehicle travel into the second position so as to concentrate the high pressure water spray from the nozzle heads 36 therein towards the rear wheels 54 of the vehicle 50, as shown in FIGS. 15 and 16. In this manner, the "dwell" time of the high pressure water spray from each vehicle washing device 10 is increased on the rear wheels 54 permitting the wheels 54 to be washed without manually scrubbing same.

Figure 17:
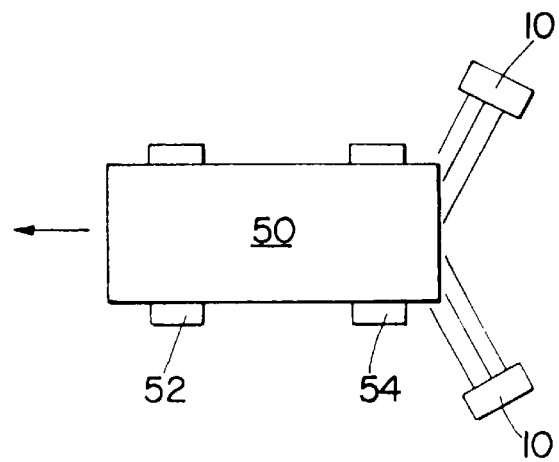
Figure 18:
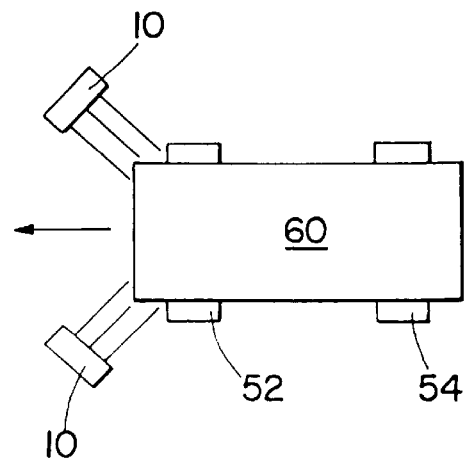

As the vehicle 50 continues to move through the car wash, the washing devices 10 continue to concentrate high pressure water spray therefrom towards the rear quarter panels of the vehicle 50 and the trunk lid of same, as shown in FIG. 17. As the next vehicle 60 enters the car wash facility and approaches the washing devices 10, the housing pivoting mechanism 22 for each washing device 10 is again actuated by the application of air pressure thereto causing each washing device 10 to rotate about its mounting shaft IS in an uninterrupted motion through an arc of approximately 30 degrees in the direction opposite to vehicle travel into the first position permitting the high pressure water spray emanating therefrom to be directed toward the front of the next vehicle 60 and its hood surface, as shown in FIG. 18. The same washing cycle then commences for the next vehicle 60.

From the foregoing description, it is apparent that the vehicle washing device 10 of the present invention and the operation of same permits the washing of the wheels on a vehicle without the need to scrub same. It accomplishes the foregoing task by increasing the "dwell" time on each of the vehicle wheels. Therefore, manual or machine scrubbing of the wheels is not required. In addition, the washing device 10 also provides for the washing of the front of the vehicle, its hood surface, its side panels, and its trunk lid without the need for any additional washing devices.

Certain modifications and improvements will occur to those skilled in the art upon reading the foregoing. It should be understood that all such modifications and improvements have been deleted herein for the sake of conciseness and readability but are properly within the scope of the following claims.

I claim:

1. A method for washing a vehicle utilizing a washing device installed within a vehicle washing facility comprising the steps of:
   a) positioning at least one of said washing devices in a first position so as to direct water spray therefrom toward the front of the vehicle as the vehicle enters the vehicle washing facility;
   b) directing the water spray from said at least one washing device toward the front wheels of the vehicle as the vehicle passes through the vehicle washing facility;
   c) moving said at least one washing device in an uninterrupted motion into a second position so as to continue to direct the water spray therefrom toward the front wheels of the vehicle as the vehicle passes through the vehicle washing facility;

d) maintaining said at least one washing device in said second position;
e) directing the water spray from said at least one washing device toward the side panels on the vehicle as the vehicle passes through the vehicle washing facility;
f) moving said at least one washing device in an uninterrupted motion into said first position so as to direct the water spray therefrom toward the rear wheels of the vehicle;
g) directing the water spray from said at least one washing device toward the rear wheels of the vehicle as the vehicle passes through the vehicle washing facility;
h) moving said at least one washing device in an uninterrupted motion into said second position so as to continue to direct the water spray therefrom toward the rear wheels of the vehicle as the vehicle passes through the vehicle washing facility;
i) maintaining said at least one washing device in said second position; and
j) directing the water spray from said at least one washing device toward the rear of the vehicle as the vehicle exits from the vehicle washing facility.

2. The method as defined in claim 1 wherein, after step j, further including the step of moving said at least one washing device in an uninterrupted motion into said first position so as to direct the water spray therefrom toward the front of the next vehicle entering the vehicle washing facility.

3. The method as defined in claim 1 wherein said at least one washing device is moved into said second position by rotating said at least one washing device in an uninterrupted motion in the direction of travel of the vehicle through the vehicle washing facility.

4. The method as defined in claim 1 wherein said at least one washing device is moved into said first position by rotating said at least one washing device in an uninterrupted motion in the direction opposite to the direction of travel of the vehicle through the vehicle washing facility.

5. The method as defined in claim 1 wherein one of said vehicle washing devices is positioned on either side of the vehicle as the vehicle passes through the vehicle washing facility.

6. The method as defined in claim 1 wherein said at least one washing device includes actuating mechanism permitting said rotation of said at least one washing device about a vertical axis.

7. The method as defined in claim 6 wherein said actuating mechanism is operatively attached to said at least one washing device.

* * * * *